United States Patent [19]

Roberts et al.

[11] Patent Number: 4,646,385

[45] Date of Patent: Mar. 3, 1987

[54] METHODS AND APPARATUS FOR FORMING LOOSE MEAT INTO LUMPS

[75] Inventors: Russell S. Roberts; Charles D. Briddell, both of York, Pa.

[73] Assignees: C. D. Briddell Inc., York, Pa.; Lubkin Frozen Foods, Inc., Beaufort, S.C.

[21] Appl. No.: 698,592

[22] Filed: Feb. 4, 1985

[51] Int. Cl.⁴ .............................................. A22C 7/00
[52] U.S. Cl. ......................................... 17/45; 17/32; 17/71; 426/513
[58] Field of Search ..................... 17/32, 71; 426/513; 425/176, 556

[56] References Cited

U.S. PATENT DOCUMENTS

| | | |
|---|---|---|
| 2,939,407 | 6/1960 | Keathley, Sr. et al. . |
| 3,041,153 | 6/1962 | Elder et al. . |
| 3,068,522 | 12/1962 | Nickerson et al. . |
| 3,311,068 | 3/1967 | Atwood et al. . |
| 3,452,689 | 7/1969 | Kinney et al. . |
| 3,468,357 | 9/1969 | Becker . |
| 4,054,967 | 10/1977 | Sandberg et al. .................. 17/32 |
| 4,193,167 | 3/1980 | Orlowski et al. ................... 17/32 |
| 4,207,654 | 6/1980 | Koppens ............................. 17/32 |
| 4,257,145 | 3/1981 | Bovino ............................... 17/32 |
| 4,298,326 | 11/1981 | Orlowski . |
| 4,371,329 | 2/1983 | Steels . |
| 4,483,046 | 11/1984 | Briddell . |

Primary Examiner—Willie G. Abercrombie
Attorney, Agent, or Firm—Burns, Doane, Swecker & Mathis

[57] ABSTRACT

Loose meat such as crabmeat is formed into lumps by pushing the loose meat upwardly into mold cavities while simultaneously pushing air and moisture through holes in back walls of the cavities, and while a releasable seal is effected around the mold cavities. The mold cavities are displaced to an ejecting station where pressurized air is supplied through the holes to eject meat lumps from the cavities. Diffusers in the holes diffuse the case into dispersed air streams which act against the back of each meat lump. After the meat lumps have been ejected, pressurized air at a higher pressure is directed through the diffusers to clean meat from the diffusers.

35 Claims, 9 Drawing Figures

METHODS AND APPARATUS FOR FORMING LOOSE MEAT INTO LUMPS

BACKGROUND AND OBJECTS OF THE INVENTION

The present invention relates to methods and apparatus for forming loose meat particles, such as fish meat particles, into solid chunks.

It has been recognized that lumps of certain foodstuffs such as crabmeat for example, are more commercially valuable than smaller lumps or loose flakes thereof. In the processing of crabs, meat is removed in the form of both lumps and flakes, with the former being marketable at higher prices than the latter which is less desired.

Proposals have been heretofore made for forming loose meat flakes into lumps, as evidenced for example by the disclosure of U.S. Pat. No. 4,483,046. Such proposals have included the process of loading loose meat into a hopper and pushing the meat from the hopper and through a smaller-diameter horizontal tube by means of a large-diameter plunger located in the hopper. The meat pushed through the tube enters a plurality of mold cavities aligned with an end of the tube. The shape of the mold cavities corresponds to that of the lumps into which the meat is to be formed. The cavities are disposed in a rotatable mold plate which, once the cavities have been filled, is rotated to expose the filled cavities while simultaneously locating a set of empty cavities, also carried by the mold plate, into alignment with the tube to receive a new charge of meat.

Among the shortcomings of such prior proposals include the difficulty involved in achieving a uniform pressure in the tube during each cavity-filling step, especially when large diameter plungers are employed to push meat through a smaller diameter tube. In the absence of uniform pressure during the molding step, the lumps do not possess a uniform density or "bite".

Another problem involves the need to produce a seal between the end of the tube and the mold plate in order to prevent meat from escaping laterally during a cavity-filling step. This could be accomplished by providing a seal ring compressed between the tube and the mold cavity, but during subsequent rotation of the mold plate, the seal would be subjected to considerable frictional rubbing and resultant wear.

Yet another problem involves the removal of the meat lumps from the cavities. In one instance a scraper blade has been employed to scoop each meat lump from the cavity. However, the blade had a tendency to deform the shape of the lump. In another instance a pressurized air stream was introduced through the back wall of each cavity to blow the lump from the cavity. However, the concentrated intensity of such air stream frequently resulted in a hole being formed through the lump. Also, the air jets exhibited a tendency to become clogged with meat which entered thereinto during the cavity-filling stage.

It is, therefore, an object of the present invention to minimize or obviate problems of the type discussed above.

A further object is to provide an apparatus for forming loose meat into lumps of uniform density.

Another object is to provide a mold for forming such lumps wherein the lumps are removed from the mold without being appreciably damaged or deformed.

A further object is to provide for the evacuation of excess air and liquid from mold cavities during the filling thereof with loose meat.

Yet another object is to provide for a tight seal around the mold cavities as they are being filled and around gas holes during ejection of the lumps.

A further object is to enable an insufficient pressure in the meat injecting pipe to be detected.

SUMMARY OF THE INVENTION

These objects are achieved by the present invention which relates to methods and apparatus for forming loose meat into lumps.

One preferred apparatus comprises a hopper for storing loose meat, the hopper having a downwardly opening discharge. A vertical injection conduit has a lower inlet and an upper outlet. A transfer conduit communicates the discharge of the hopper with the inlet of the injection conduit. A mechanism is provided for displacing loose meat through the transfer conduit and into the injection conduit. A mold plate is disposed above the outlet of the injection conduit and possesses first and second ends. Each end of the mold plate includes a set of downwardly facing cavities, each of the cavities including a base wall having a hole therethrough. A mechanism is provided for shifting the mold plate such that the sets of cavities are alternately situated at injecting and ejecting stations, the set of cavities at the injecting station being communicable with the outlet of the injection conduit. A plunger is disposed in the ejection conduit for pushing loose meat through the outlet and into the cavities which are disposed at the injecting station. A gas eject member is positioned at the ejecting station above the mold plate and includes gas ports communicating with upper ends of the holes of the sets of cavities disposed at the ejecting station. A source of pressurized gas communicates with the gas ports to supply pressurized gas downwardly through the holes to eject meat lumps from the associated cavities. Sealing structure is provided for forming a seal around the cavities at the ejecting station and around the upper ends of the holes of the cavities situated at the ejecting station.

Preferably, gas diffusers are disposed in the holes of the cavities. Each diffuser comprises passages communicating with the associated cavity and oriented to emit gas in a dispersed pattern. Preferably, the passages are of convoluted configuration. Preferably, the diffuser element is formed of balls which are fused together at their points of contact.

Preferably, a pressure plate is slidably mounted on the ejection conduit and is displaced upwardly toward the mold plate in order to effect a seal around the cavities during the ejecting stage. A resilient sealing member may be disposed between the pressure plate and the mold plate to effect the seal.

Preferably, the mold plate is vertically movable so as to be pushed upwardly toward the gas eject member in response to upward forces from the pressure plate.

Preferably, an arrangement is provided to emit gas initially at a lower pressure into the cavities to eject meat lumps, and thereafter at a higher pressure to clear meat from the diffuser elements. The present invention also relates to the method aspect of cleaning the diffuser elements in this manner.

BRIEF DESCRIPTION OF THE DRAWINGS

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

As used herein, the expression "loose meat" pertains to any foodstuffs capable of being formed together into larger pieces or lumps. The present invention is particularly useful in forming flakes of crabmeat into larger lumps, and to form small scallops (so-called "bay scallops") into large "ocean size" scallops. Other foodstuffs capable of being processed by the present invention are to be included under the expression "loose meat".

Figure 1:
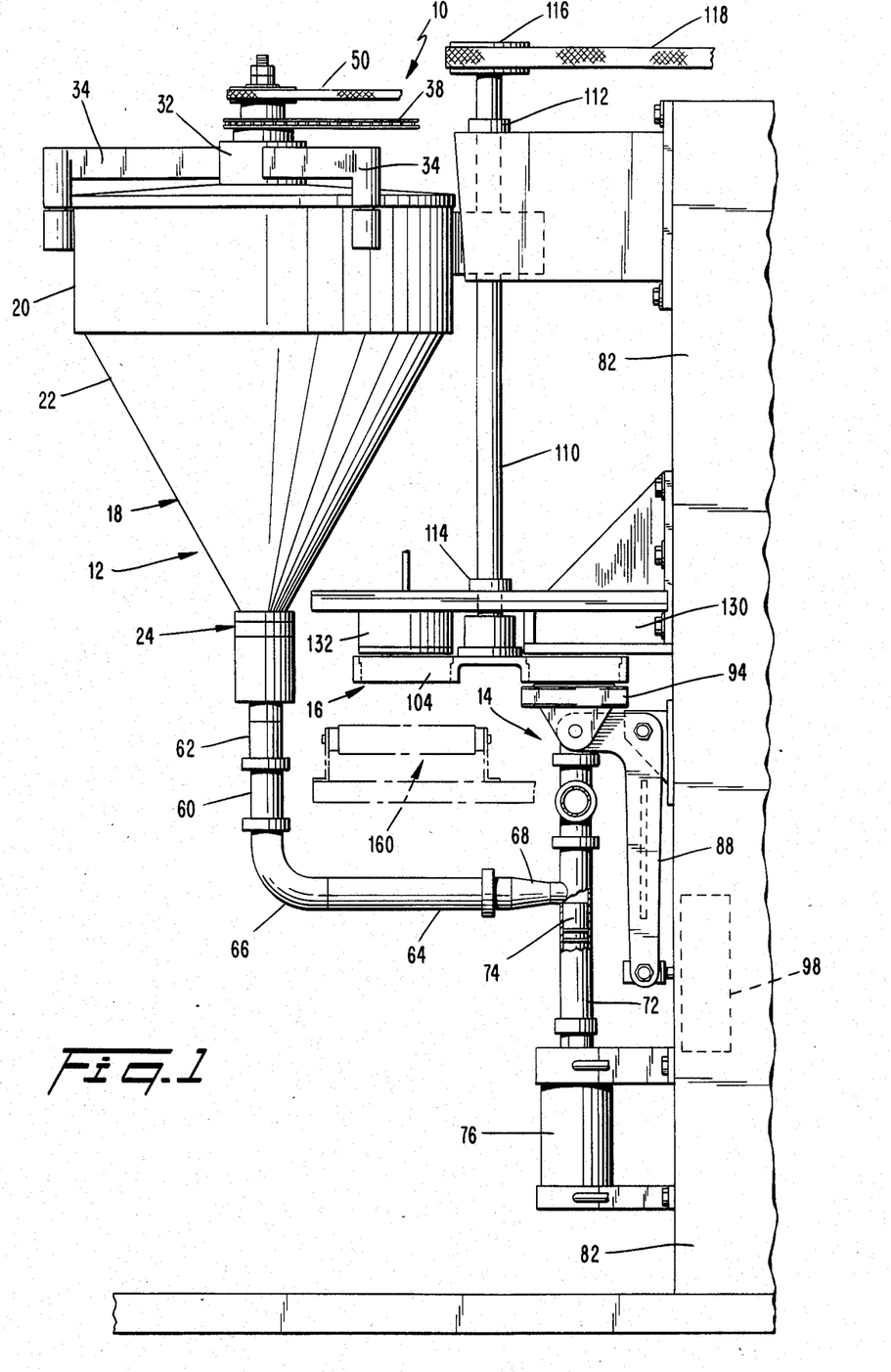
FIG. 1 is a side elevational view of an apparatus according to the present invention.

A lump-forming apparatus 10 depicted in FIG. 1 basically includes a meat supply station 12 which supplies meat particles to an injecting station 14 wherein the particles are forced into mold cavities to assume a desired shape, and an ejecting station 16 where the shaped lumps of meat are ejected from the mold cavities.

Figure 2:
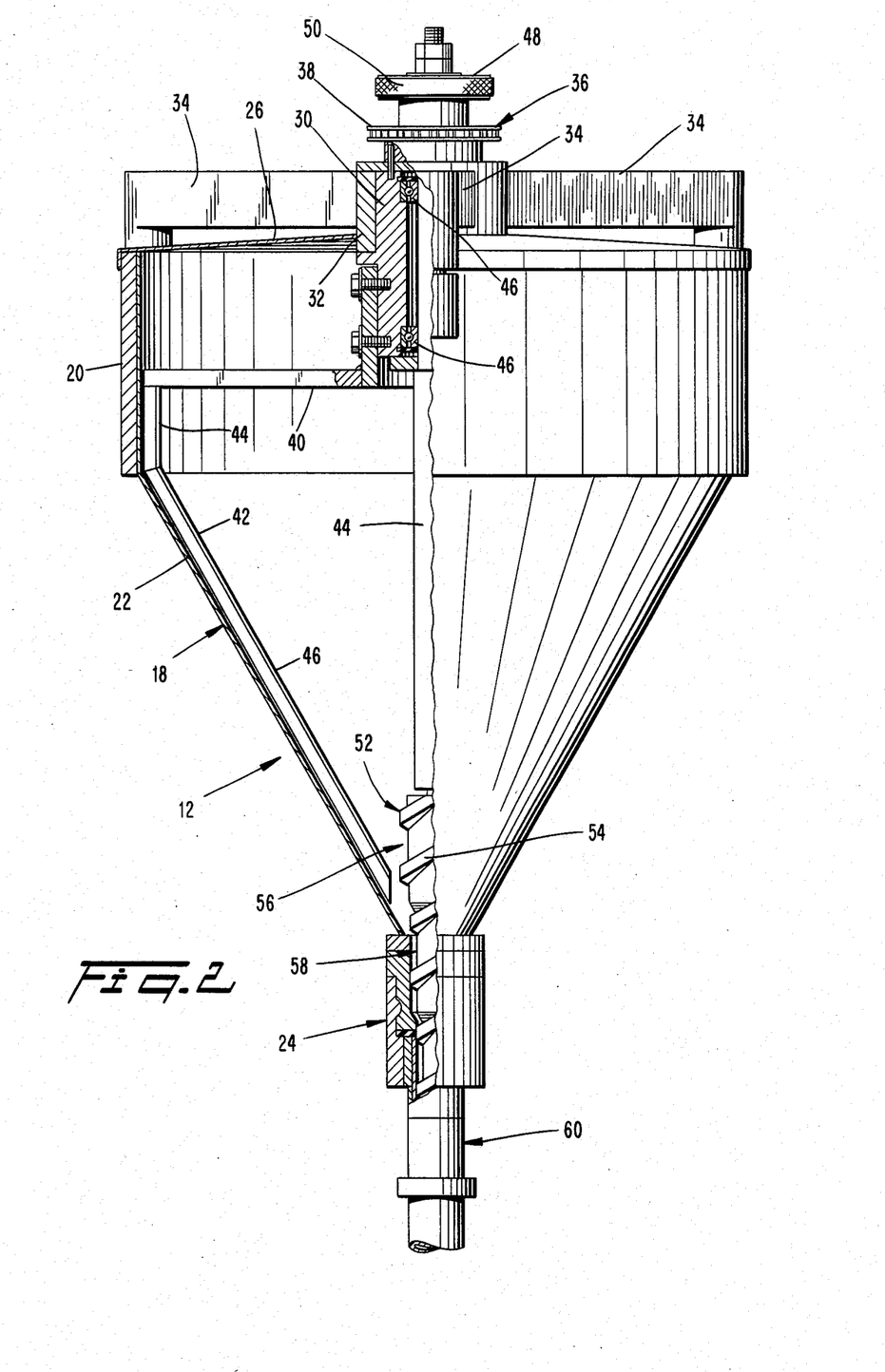
FIG. 2 is a side elevational view, partly in vertical section of a hopper for storing meat according to the present invention.
Figure 7:
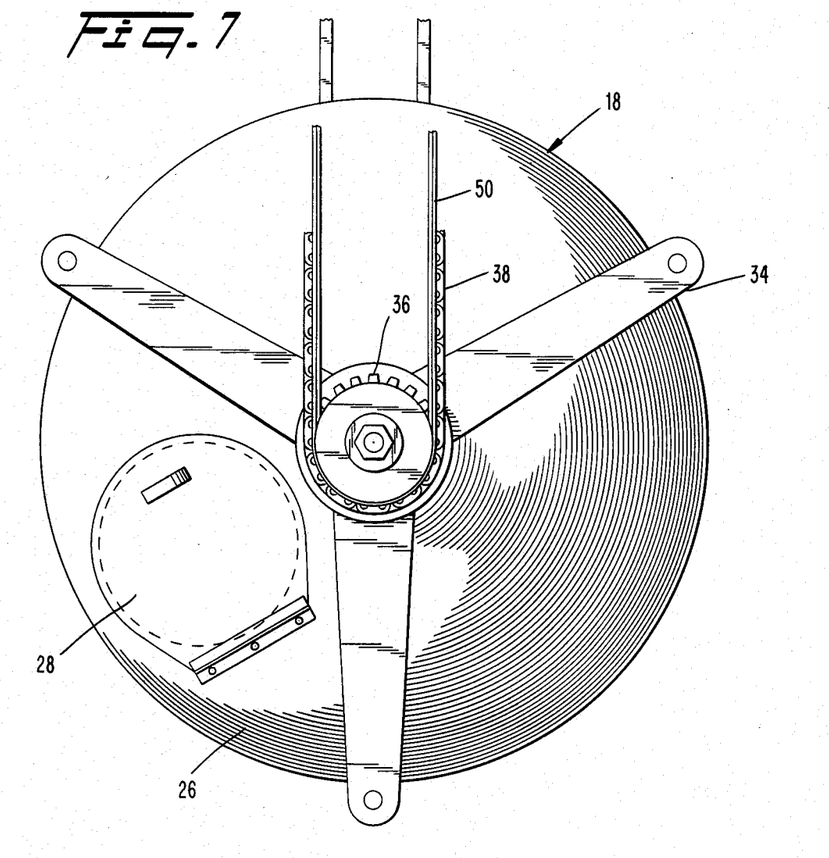
FIG. 7 is a plan view of the hopper depicted in FIG. 2.

The supply station 12 comprises a hopper 18 which includes a cylindrical upper section 20 and a frusto-conical lower section 22 which terminates in a lower discharge outlet 24 (see FIGS. 1 and 2). The top of the hopper is enclosed by a cover 26 which includes a door 28 (FIG. 7) that can be opened to enable the hopper to be filled with loose meat particles. In the center of the cover a short, hollow, vertical shaft 30 is mounted for rotation about a vertical axis. The shaft 30 is mounted within a sleeve 32 supported by three radial arms 34 which are fastened to the side of the hopper. The shaft 30 is driven by a drive sprocket 36 which, in turn, is driven by a motor by a drive chain 34. Attached to the hollow shaft 30 by an arm 40 is a scraper blade 42. The scraper blade 42 includes vertical and inclined portions 44, 46 which conform to the inside profile of the hopper 18. As the blade 42 is rotated, it scrapes meat particles from the inside surface of the hopper and generally keeps the meat particles in a mobile condition within the hopper.

Extending coaxially through the short shaft 30 is a long shaft 44 rotatably supported by bearings 46 disposed between the long and short shafts. At its upper end the long shaft 44 is connected to a drive pulley 48 which is intermittently rotatably driven by a suitable motor and belt drive 50. At its lower end the long shaft 44 is connected to a feed auger 52. The feed auger is of the three stage type and includes a helical blade 54 which decreases in diameter from a larger diameter (upper stage) 56 to a medium diameter (middle stage) 58 to a small diameter (lower stage), the latter not being depicted. As the blade is rotated, it advances meat particles through the discharge opening and into a transfer tube 60 which is connected to the discharge opening.

The transfer tube 60 includes an upstream vertical portion 62, a downstream horizontal portion 64, and an elbow portion 66 interconnecting the vertical and horizontal portions 62, 64. At its terminal end 68 the downstream portion progressively diminishes (tapers) in diameter toward an outlet port 70 which also constitutes an inlet port formed in the side of a vertical injection pipe 72, the latter forming part of the injecting station 14.

Reciprocally mounted within the injection pipe 72 is a plunger 74. The plunger is connected at its lower end to a conventional fluid ram 76 so as to be reciprocable toward and away from an outlet end 78 of the pipe. A bracket 80 fixedly connects the ram 76 to a fixed housing 82. The ram 76 is of the conventional type which advances the plunger 74 at a pre-set pressure and stops when the resistance to travel encountered by the plunger 74 equals the advancing force imposed by the ram 76. Thus, after a charge of meat has been introduced into the injection pipe 72, the plunger advances the entire column of meat within the injection pipe a small distance until the resistance encountered by the plunger 74 equals the force applied by the ram. This occurs when an array of mold cavities has been filled with meat as will be discussed below. In that way, it is assured that, from one molding step to another, the meat within the mold cavities is subjected to uniform pressure and the resulting lumps exhibit a uniform density.

Slidably mounted on the injection pipe adjacent the outlet end 78 thereof is a pressure plate 94. The pressure plate has a pair of ears 86 affixed thereto, the ears 86 being pivotably connected to a pair of bell crank levers 88. The levers each include horizontal and vertical leg portions 90, 92 and are pivoted by a pin 96 to the frame 82 at the junction of those two leg portions 90, 92. A fluid ram 98 has its rod end 99 pivotably connected to a bolt 100 which interconnects the lower ends of the vertical leg portions 92 for rotating the levers about the pivot 96. When the levers rotate in one direction (i.e., clockwise as viewed in FIG. 3), the pressure plate 94 is displaced upwardly relative to the injection tube 72 toward a mold plate 104 which carries the mold cavities 106. When the levers 88 are rotated in the opposite direction, the pressure plate 94 is displaced away from the mold plate until a shoulder 101 on the pressure plate 94 abuts against the upper end 78 of the injection pipe 72. That shoulder surrounds an opening 103 in the pressure plate which is coaxially aligned with the injection tube 72. An O-ring seal 108 is carried in an upper surface of the pressure plate 94, which ring 108 creates a seal around the mold cavities 106 when the pressure plate is pushed against the mold plate preparatory to a meat injecting operation as will be explained subsequently.

The mold plate 104 is fixedly carried at a lower end of a drive shaft 110, the latter being rotatably mounted to the frame 82 by suitable bearings 112, 114. The drive shaft 110 is freely axially movable to a limited extent within those bearings 112, 114. A drive pulley 116 is mounted at the opposite end of the shaft 110 and is intermittently driven by a suitable drive motor and drive belt 118 to oscillate the mold plate 104.

The mold plate 104 (FIGS. 6 and 8) includes two sets of mold cavities 106 and 106A disposed at opposite ends thereof. Each cavity set comprises circularly arranged cavities (e.g., six in number). Each cavity is in the desired shape of a meat lump to be produced, such as a crabmeat lump for example. A pair of air holes 120 communicates with a base wall 122 of each cavity, the holes extending completely through the mold plate 104. Disposed within each air hole is an air diffuser element 124. Preferably the diffuser element 124 is in the shape of a cylinder consisting of very small stainless steel balls, e.g., the balls may have a diameter of from 0.012 to 0.016 inches and may form a cylinder of 0.375 inches diameter and 0.375 inches long. The diffusers may be formed in other shapes, such as rectangular blocks for example. The cylinder 124 can be fabricated by arranging the balls in a cylindrically-shaped cavity (not shown) and then fusing the balls together at their points of contact under heat and pressure. As a result, the balls form a cylinder having a series of convoluted or circuitous passages traveling from one end of the cylinder to the other.

Figure 6:
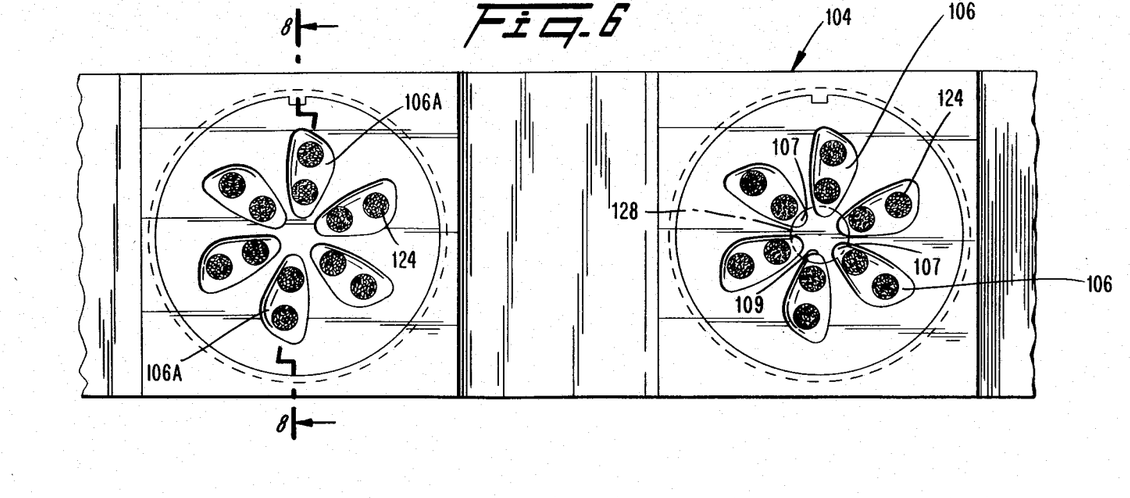
FIG. 6 is a bottom plan view of the mold plate when none of the mold cavities contain meat.
Figure 8:
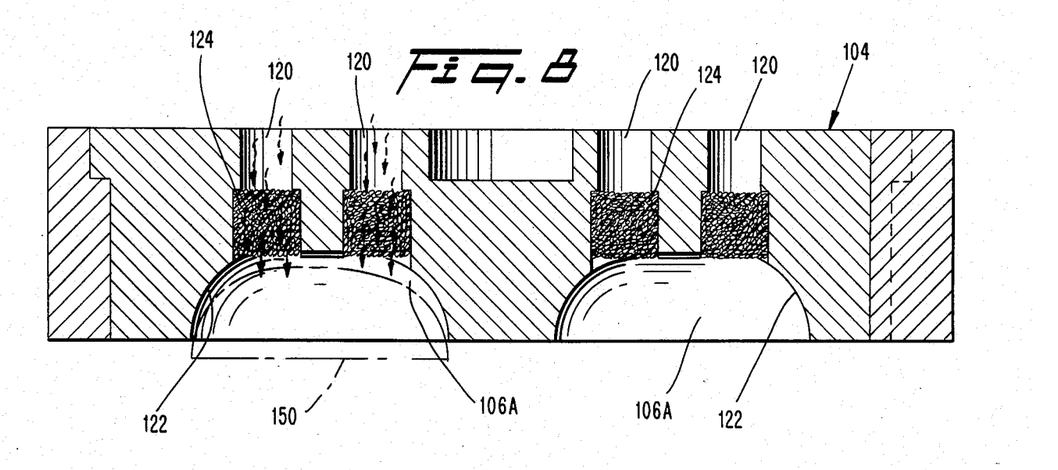
FIG. 8 is a cross-sectional view taken along line 8—8 of FIG. 6, and depicting in phantom lines a meat lump being ejected from a mold cavity.
Figure 9:
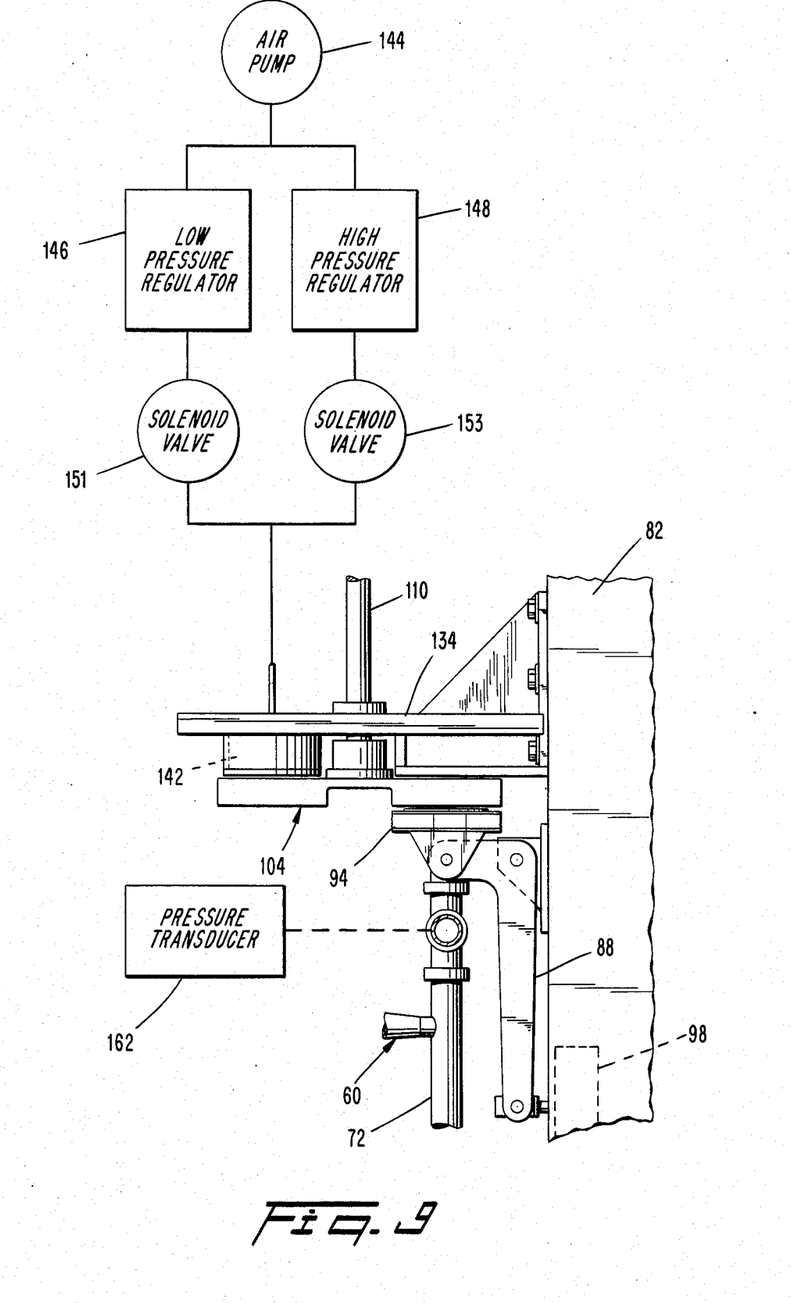
FIG. 9 is a schematic representation of means for supplying pressurized gas to the air eject plate, and for sensing pressure in the injection conduit.

The diffuser cylinders 124 are press-fit into the holes 120 such that inner ends of the cylinders abut shoulders 126 in the holes, and outer ends of the cylinders lie substantially flush with the base wall 122 of the cavity.

The mold plate 104 is intermittently oscillatable in 180 degree increments so that each set of cavities 106, 106A becomes sequentially positioned at the cavity ejecting station 16, and at the cavity injection station 14. The cavities 106 located at the injecting station 14 are communicable with the opening 103 in the pressure plate 84. The diameter of that opening 103 is sufficient to overlap the radially inner portions 107 of the cavities as is depicted in FIG. 6 wherein the circle 128 drawn in phantom lines represents the diameter of the opening 103 as it relates positionally to the cavities at the injecting station. During a meat injecting stage, the meat is pushed into the cavities simultaneously through those inner portions 107 of the cavities.

Figure 5:
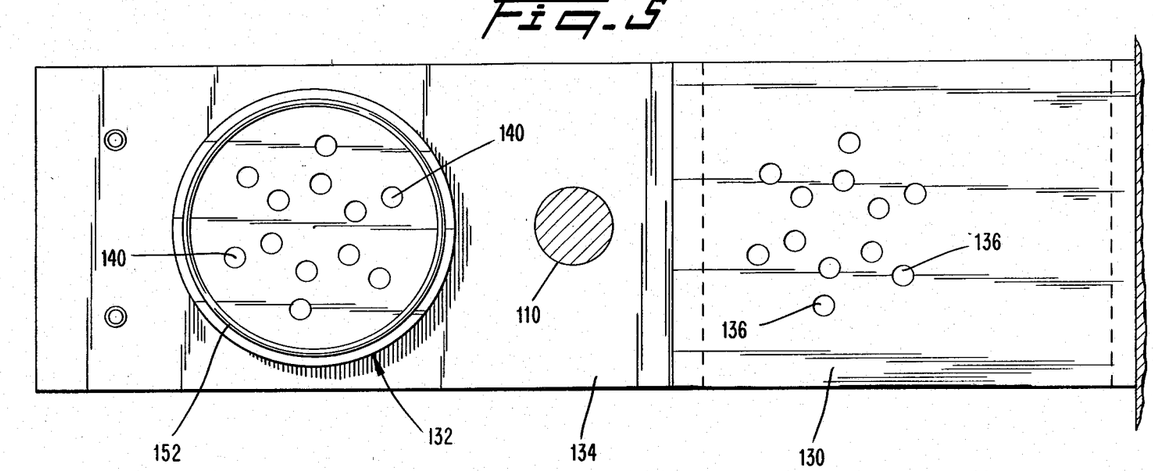
FIG. 5 is a bottom plan view of the reinforcing plate and air eject plate.

As noted earlier, when the pressure plate 94 is pushed against the mold plate, a seal is established around the cavities by the ring 108 so that no meat or juice is able to squeeze laterally outwardly. Also as will be discussed subsequently, the pressure plate 94 is able to push the entire mold plate 104 upwardly. When that occurs, the end of the mold plate 104 located at the injecting station 14 is pushed against a reinforcing plate 130 (FIGS. 3 and 5), and the opposite end of the mold plate 104 located at the ejecting station 16 is pushed against an air eject plate 132. The reinforcing plate 130 and air eject plate 132 are mounted on a stationary bracket 134 which is connected to the frame 82.

At the injecting station 14, meat particles are pushed by the plunger 74 into the cavities 106 (FIG. 4) while air and juice are pushed through the diffuser elements 124 located in the holes 120 of each cavity 106. Those holes 106 are aligned with corresponding ports 136 in the reinforcing plate 130 so that the air and juices may escape from the holes 106. As a result, it is assured that the cavities 106 will be completely filled with meat particles, i.e., no appreciable voids will be created by air or juice at the base of a cavity. Due to the convoluted nature of the passages in the diffuser elements, the tendency for meat particles to enter and clog the passages will be resisted.

After the cavities 106 have been filled, the mold plate 104 is rotated 180 degrees to position the now-filled cavities at the ejecting station wherein the holes in the cavities are aligned with respective ports 140 in the air eject plate 132. Those ports 140 communicate with a common manifold 142 (FIG. 4) which, in turn, communicates with a source of pressurized air such as an air pump 144 which delivers pressurized air to the manifold 142. The pump is connected in parallel to first and second conventional pressure regulators 146, 48, each having a solenoid-actuated valve 151, 153. The first regulator 146 regulates pressure at a lower pressure (e.g., 35–50 psi), and the second regulator 148 regulates pressure at a higher pressure (e.g., 80–100 psi). Upon actuation of the solenoid valve 151 associated with the low pressure regulator 146, pressurized air travels through the manifold 142, the ports 140, the holes 120 and the convoluted passages in the diffuser elements 124. The air discharged from the holes 120 is highly diffused in an array of numerous, randomly directed air streams which impinge upon the back of the meat lump 150 in the cavity (FIG. 8). Since the air flow is diffused into a dispersed array of streams, no appreciable damage will be inflicted upon the meat lumps. Some of the air streams are directed generally laterally relative to the longitudinal axis of the diffuser element and will travel along the base wall 122 of the cavity to, in effect, gently strip the lump from such base wall. Hence, there is no need to employ a separate stripper member to scrape the lump from the cavity.

Leakage of air from between the mold plate and the air eject plate is prevented by the presence of an O-ring seal 152 which is sized to surround the ports 140 in the air eject plate 132. The seal 152 is depicted as being mounted on the air eject plate 132, but it could just as easily be mounted on the mold plate 104, as could the earlier discussed seal ring 108.

As noted earlier, the pressure plate 84 is operable to push the mold plate 104 upwardly whereby the end of the mold plate at the ejecting station 16 is pushed upwardly against the air eject plate 132. In so doing, the O-ring 152 is compressed whereby the above-discussed sealing action is established.

Meat lumps 150 which are ejected from the cavities 106A fall downwardly onto a conveyor belt 160 which carries the lumps away for further processing. It will be appreciated that the conveyor is able to be located in close proximity to the mold plate 104 whereby the meat lumps have little distance to travel and are thus less likely to be damaged during the fall.

After the meat lumps have been ejected, the solenoid valve 153 of the second, high-pressure regulator 148 is actuated, in order to clear the diffuser elements 124 of any meat particles which may have become lodged therein.

After the meat lumps 150 have been ejected (and thus after the other set of cavities 106 at the injecting station 14 have been filled), the pressure plate 84 is retracted downwardly, whereupon the mold plate 104 descends by gravity to its normal position (FIG. 3) and is rotated 180 degrees. Thus, the emptied cavities are returned to the injecting station 14 to be refilled.

In order to assure that the system will not operate when the hopper has been emptied, a mechanism is provided for automatically shutting down the system in such an event. That mechanism comprises a conventional pressure transducer 162 which communicates with the injection pipe 72 at a location between the inlet 70 and outlet 78, to measure the pressure in the injection pipe 72 during an injecting stage. If the pressure sensed by the transducer is below a given minimum value, the transducer will supply a signal for shutting down the mechanism. One preferred transducer is a sanitary pressure transducer manufactured by Anderson Instrument Co., Inc. of R.D. #1, Fultonville, N.Y. and marketed under the name "SP150".

IN OPERATION, loose meat (such as flakes of crabmeat or small bay scallops for example) is supplied to the hopper 18. The rotating scraper 42 keeps the meat loosely disposed therein. Assuming that one set of mold cavities 106A has already been filled and is situated at the ejecting station 16, the ram 98 is actuated to push the pressure plate 94 upwardly against the mold plate 104, whereupon the mold plate 104 is pushed upwardly into engagement with the air eject plate 132 and the reinforcing plate 130. The seal rings 108 and 152 disposed between the mold plate 104 and the pressure plate 94 on the one hand, and between the mold plate 104 and the air eject plate 132 on the other hand, are compressed to form seals around the mold cavities 106 at the injecting station 14 and around the upper ends of the holes 120 associated with the cavities 106A at the ejecting station 16.

Figure 3:
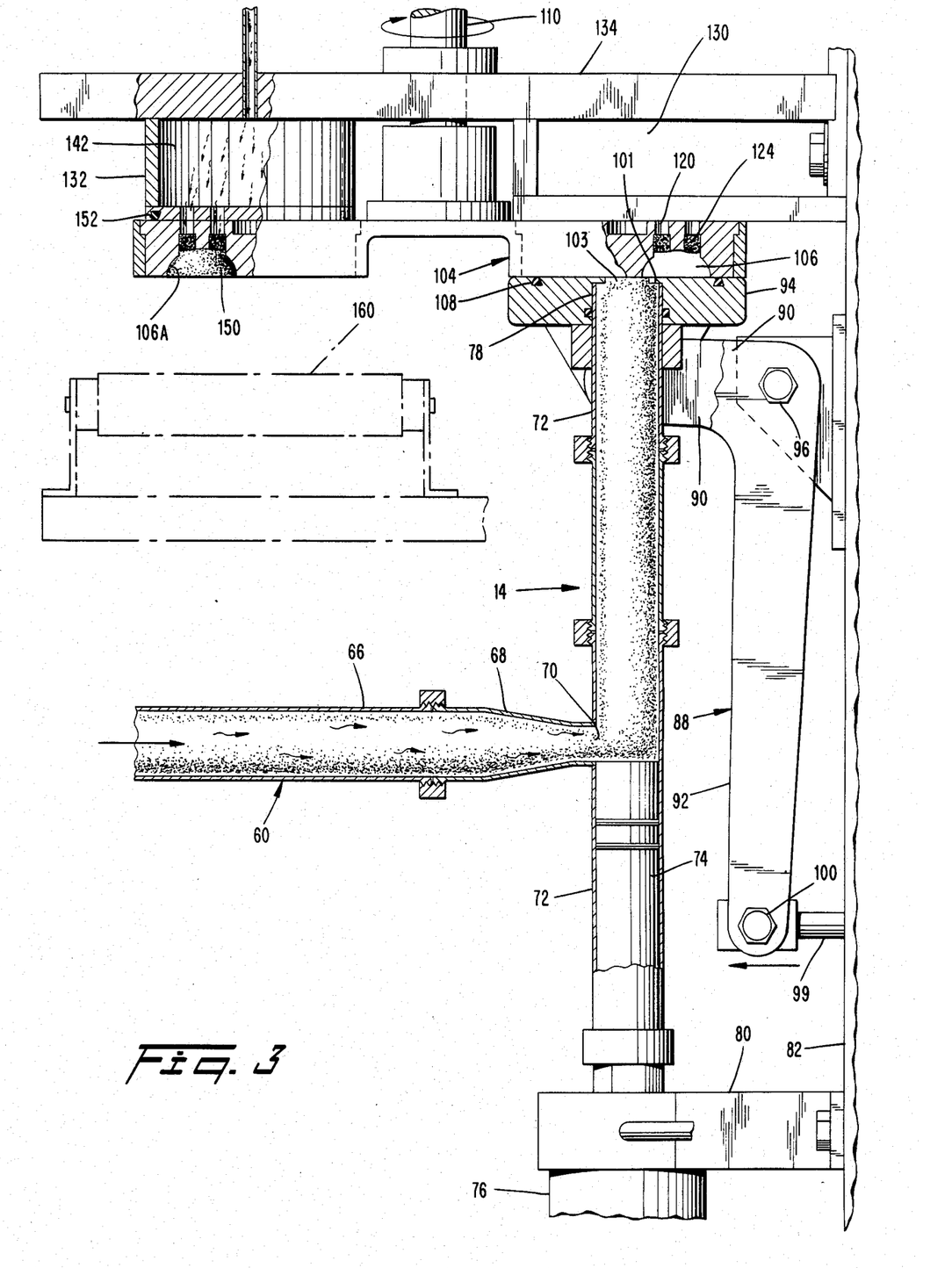
FIG. 3 is a side elevational view of a portion of the apparatus which includes the injecting and ejecting stations, portions of which are broken away to depict the interior of an ejection tube as meat particles are fed thereto, and to depict the interior of the mold plates and air eject plate as pressurized air is initially supplied thereto in order to eject meat lumps from the mold cavities.

The solenoid valve 151 for the low-pressure regulator 146 is then actuated to admit low pressure air through the ports 140 and holes 120 and into the filled cavities 106A (FIGS. 3 and 8). The air is dispersed through the convoluted passages of the diffuser elements 124 into an array of randomly directed air streams which gently eject the lumps 150 from the cavities. The ejected lumps fall upon the conveyor 160 for travel to a subsequent processing area. As the ejection of the lumps is being effected, the auger is simultaneously actuated to advance a charge of loose meat into the injection pipe 72.

Figure 4:
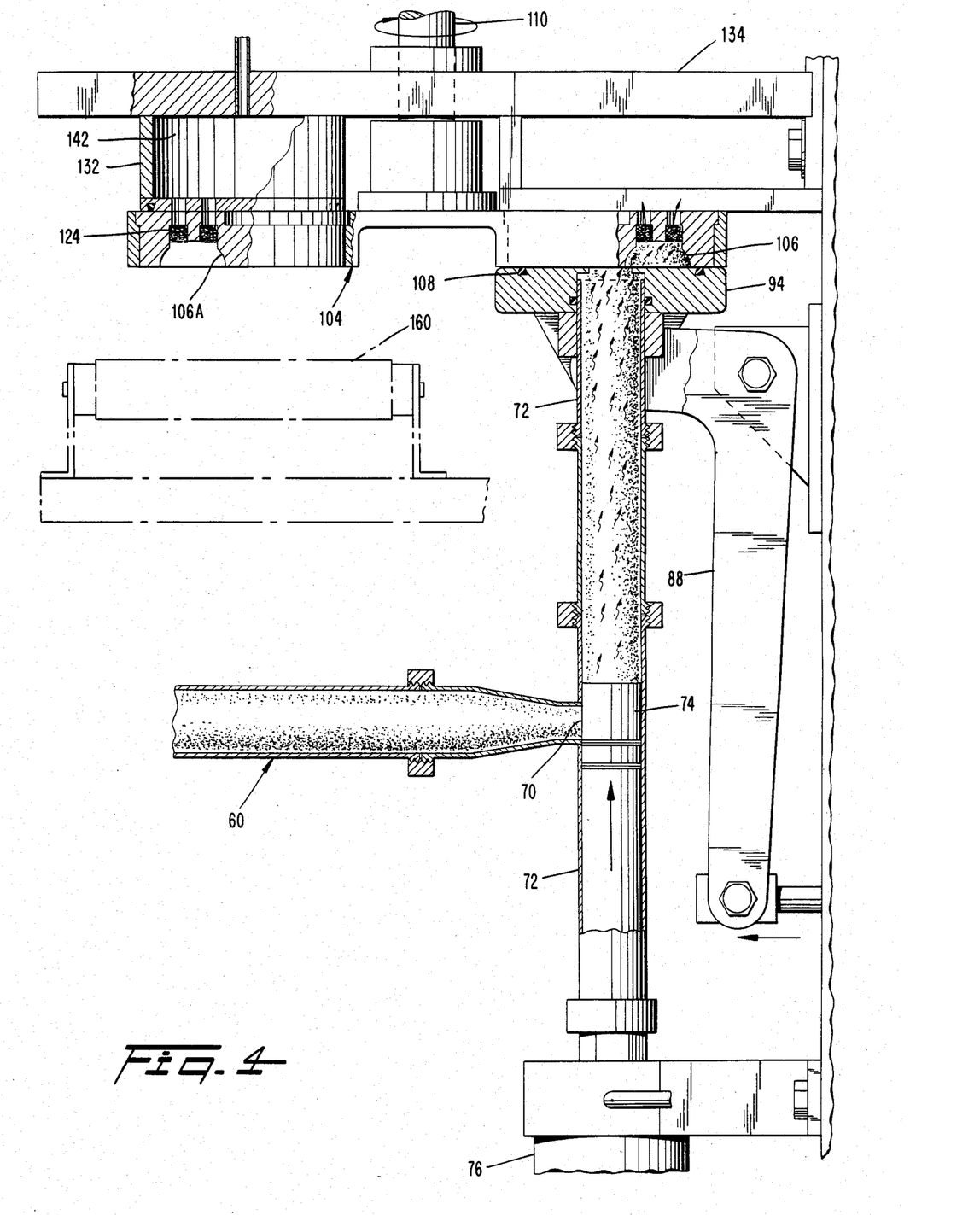
FIG. 4 is a view similar to FIG. 3 depicting the plunger in the process of pushing loose meat into the cavities at the injecting station.

Following the ejection of the lumps and the insertion of a charge of loose meat into the injection pipe 72, the plunger 74 is advanced to push loose meat simultaneously into the six cavities 106 at the injecting station 14 (FIG. 4). Air and excess liquid which might otherwise become trapped at the base of the mold cavities is expelled through the holes 120 in those cavities. The travel of meat into the holes 120 is resisted by the diffuser elements 124.

During the advance of the pluner 74, the solenoid 153 of the high-pressure regulator 148 is actuated to direct high pressure air through the holes 120 at the ejecting station 16 to clear the diffuser elements of the just-emptied cavities 106A.

The pressure plate 94 is then retracted by the ram 98, whereupon the mold plate 104 gravitates downwardly to its released position (FIG. 1). The shaft 110 is then driven to rotate the mold plate 104 by 180 degrees. It will be appreciated that a column of meat extends from the opening 103 of the pressure plate to the inner portions 107 of the cavities 106, which column is sheared-off by edges 109 of the cavities. The size (cross-section) of the column which needs to be sheared-off is relatively small since the radially inner portions 107 of the cavities are overlapped by the opening 103. Thus, the effort needed to shear-off the column is relatively low and can be accomplished by the edges 109 of the cavities. Following the 180 degree rotation of the mold plate, the above-described ejection and injection steps are repeated.

In the event that an insufficient mount of meat is disosed within the injection pipe 72, the resultant low pressure is sensed by the pressure transducer 162 which emits a signal for shutting down the machine.

It should be understood that the system described above is ideally suited to actuation by a programmable controller whereby all of the steps are carried out automatically.

It will be appreciated that the present invention provides a rapid and effective mechanism for forming loose meat into lumps. By providing a pluner 74 which is of about the same cross-sectional area as the meat outlet 103, and which is advanced until encountering a prescribed amount of resistance (as opposed to a predetermined stroke length), the injection pressure, and thus the meat lump density will be uniform from one molding operation to another.

The pressure plate 94 functions in the creation of an effective seal around the empty cavities 106 and the holes 120 of the filled cavities 106A to prevent leakage of meat and air, respectively, at those locations.

The presence of holes 120 in the back walls of the mold cavities 106, 106A assures that excess air and liquid will be expelled from the cavities during the meat injection stage to enable the cavities to be fully filled with meat.

The air diffusers 124 in the cavity holes 120 assure that the pressurized ejection air will be diffused into an array of air streams, to avoid the problem of damage occuring to the lumps by high intensity air streams. Furthermore, the air streams will be ejected in a dispersed pattern, including generally laterally directed streams to gently "scrape" the meat lumps from the cavities. Also, the convoluted passages of the diffusers 124 retard the travel of loose meat thereinto during the meat injection stage, so as to minimize clogging tendencies. By applying high pressure air to the diffusers 124 after the lumps have been ejected, the diffusers are effectively cleaned. The diffusers themselves, being formed of a mass of fused steel balls, are easily fabricated and are highly sturdy and wear resistant.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Apparatus for forming loose meat into lumps, comprising:
   a hopper for storing loose meat, said hopper having a downwardly opening discharge,
   a vertical injection conduit having a lower inlet and an upper outlet,
   a transfer conduit communicating said discharge with said inlet, means for displacing loose meat through said transfer conduit and into said injection conduit, a mold plate disposed above said outlet of said injection conduit and having first and second ends, each end including a set of downwardly facing cavities, each of said cavities including a base wall having a hole therethrough, means for shifting said mold plate such that said sets of cavities are alternately situated at injecting and ejecting stations, the set of cavities at said injecting station being communicable with said outlet of said injection conduit, a plunger in said injection conduit for pushing loose meat through said outlet and into said cavities which are disposed at said injecting station, a gas eject member positioned at said ejecting station above said mold plate, and including gas port means communicating with upper ends of said holes of the set of cavities disposed at said ejecting station, gas pressure means communicating with said gas port means to supply pressurized gas downwardly through said last-named holes to eject meat lumps from the associated cavities, and sealing means for forming a seal around said cavities at said injecting station and around the upper ends of said holes of the cavities situated at said ejecting station.

2. Apparatus according to claim 1 including gas diffusers in each of said holes, each diffuser comprising passages communicating with the associated cavity and oriented to emit gas in a dispersed pattern.

3. Apparatus according to claim 2, wherein said passages are of convoluted configuration.

4. Apparatus according to claim 3, wherein said diffuser element is formed of balls fused together at their points of contact.

5. Apparatus according to claim 1, wherein said sealing means includes a pressure plate slidably mounted on said injection conduit, and means for displacing said pressure plate upwardly toward said mold plate.

6. Apparatus according to claim 5, wherein said sealing means includes a resilient sealing member disposed between said pressure plate and said mold plate which is compressed to form a seal around the cavities at said injecting station.

7. Apparatus according to claim 5, wherein said mold plate is vertically movable to be pushed upwardly toward said gas eject member in response to upward forces from said pressure plate.

8. Apparatus according to claim 7 including a resilient sealing member disposed between said mold plate and said gas eject member to create a seal around the upper ends of said holes.

9. Apparatus according to claim 1 including a revolving scraper in said hopper for scraping loose meat from an inside wall of said hopper.

10. Apparatus according to claim 1, wherein said gas pressure means includes means for supplying pressurized gas to said port means at a low pressure for ejecting lumps of meat and at a higher pressure thereafter for clearing meat from said diffuser elements.

11. Apparatus according to claim 1 including transducer means communicating with said injection conduit for sensing pressure therein as meat is being inserted into said cavities at the injecting station.

12. Apparatus for forming loose meat into lumps, comprising:

an injection conduit having an opening therein for receiving loose meat, and an outlet for discharging such loose meat, a mold plate having a set of cavities opening toward said outlet, a plunger in said feed conduit for pushing loose meat from said injection conduit and longitudinally into said cavities, a pressure plate longitudinally slidably mounted on said injection conduit for movement relative to said injection conduit toward and away from said mold plate, and means for pushing said pressure plate toward said mold plate relative to said injection conduit to seal around said cavities during the injection of loose meat thereinto.

13. Apparatus according to claim 12 including a loose meat hopper communicating with said injection conduit, and a multi-stage screw for displacing loose meat from said hopper and into and through said injection conduit.

14. Apparatus according to claim 12, wherein said cavities are arranged in a generally annular pattern, said cavities positioned such that radially inner portions thereof are communicable with said outlet, with remaining portions of said cavities covered by said pressure plate.

15. Apparatus according to claim 12 including a resilient seal disposed between said mold plate and said pressure plate for effecting the seal.

16. Apparatus according to claim 15, wherein said cavities each include at least one hole for admitting pressurized gas into the cavity to eject meat lumps therefrom, a gas ejection plate positioned at an end of said mold plate opposite said injection conduit and spaced from said injection conduit in a direction laterally of the longitudinal axis of said outlet, said mold plate being movable in its own plane to relocate said set of cavities beneath said gas ejection plate after said cavities have been filled with loose meat, said mold plate being further movable in a direction parallel to said axis and toward said gas eject plate in response to being pushed by said pressure plate, to compress said resilient seal for creating the seal around all of said holes in said cavities.

17. Apparatus according to claim 12 including a gas diffuser disposed in each of said hole and including an array of convoluted passages oriented to emit gas in a dispersed pattern of streams into the associated cavity.

18. Apparatus according to claim 17, wherein each of said diffuser comprises a mass of balls fused together at their points of contact.

19. Apparatus according to claim 18, wherein said balls are bonded together to form a cylinder, said holes being of corresponding shape to receive said cylinders with a press-fit.

20. Apparatus for forming loose meat into lumps comprising:

a mold plate having a plurality of cavities therein,
  each cavity opening in a forward direction and having a back wall with at least one hole therethrough, means for inserting loose meat into said cavities to form lumps, means for directing pressurized gas into a rear end of each said hole whereby the gas enters said cavity to eject the lumps, and a diffuser element disposed in each hole and including a plurality of passages oriented to diffuse the gas into a dispersed pattern of streams entering each said cavity.

21. Apparatus according to claim 20, wherein said passages are of convoluted shape.

22. Apparatus according to claim 21, wherein each said diffuser comprises a mass of balls bonded together at their points of contact.

23. Apparatus according to claim 22, wherein said balls are formed into the shape of a cylinder.

24. Apparatus according to claim 22, wherein said balls have a diameter of between 0.012 and 0.016 inches.

25. Apparatus according to claim 22, wherein said balls are formed of stainless steel.

26. Apparatus for forming loose meat into lumps, comprising:
a hopper for storing loose meat, said hopper having a downwardly opening discharge,
a transfer conduit comprising a vertical section communicating with said discharge, and a horizontal section communicating with said vertical section, said horizontal section terminating in an outlet,
an auger disposed in said hopper discharge for displacing loose meat from said hopper through said transfer conduit,
a vertical injection conduit having an inlet in a side thereof, said inlet communicating with said outlet of said transfer conduit to receive loose meat therefrom, said injection conduit terminating upwardly in an outlet,
a mold plate disposed above said outlet of said injection conduit and mounted for limited axial movement along a vertical axis and for rotation about said vertical axis, said mold plate including first and second ends located at opposite sides of said vertical axis and carrying first and second sets of downwardly facing cavities, respectively, such that one of said sets of cavities is situated at an injecting station in alignment with said outlet of said feed conduit, and the other of said sets of cavities is situated at an ejecting station,
each of said cavities including a base wall having at least one hole therethrough which contains gas diffuser means having a plurality of convoluted passages communicating with said passage and oriented to emit gas in a dispersed pattern of streams,
a plunger in said injection conduit for pushing loose meat through said outlet thereof and simultaneously into said one set of cavities,
a gas eject plate positioned at said ejecting station above said mold plate, and including gas duct means communicating with upper ends of said holes of said other set of cavities,
gas pressure means communicating with said duct means to supply pressurized gas through said convoluted passages of said diffuser elements and into said other set of cavities to eject meat lumps from said other set of cavities,
a pressure plate slidably mounted on said injection conduit for movement toward and away from said mold plate, and
means for pushing said pressure plate upwardly against said mold plate to raise said mold plate into engagement with said gas eject plate, whereby a seal is created between said outlet of said feed conduit and said one set of cavities during injection, and between said gas eject plate and said upper ends of said holes of said other set of cavities during ejection.

27. Apparatus according to claim 26, wherein said gas pressure means includes means for supplying pressurized gas to said duct means at a low pressure for ejecting lumps of meat and at a higher pressure thereafter for clearing meat from said diffuser elements.

28. Apparatus for forming loose meat into lumps, comprising:
a hopper for storing loose meat, said hopper having a discharge opening,
an injection conduit having an inlet and an outlet, said inlet communicating with said discharge opening,
means for displacing loose meat through said discharge opening and into said injection conduit,
a pressure plate surrounding said outlet of said injection conduit,
a mold plate facing said outlet of said injection conduit and having first and second ends, each end including a set of cavities arranged in a generally annular pattern,
means for shifting said mold plate such that said sets of cavities are alternately situuated at injecting and ejecting stations, the set of cavities at said injecting station being arranged such that radially inner portions of said cavities are communicable with said outlet of said injection conduit, the remaining portions of said cavities being covered by said pressure plate,
a plunger in said injection conduit for pushing loose meat through said inner portions of said cavities disposed at said injecting station, such that the loose meat fills said cavities,
sealing means for forming a seal around said cavities at said injecting station, and
means for ejecting meat lumps from said cavities at said ejecting stations.

29. Apparatus according to claim 28, wherein said sealing means comprises a resilient element, said pressure plate being movable toward said mold plate relative to said outlet in the longitudinal direction of said outlet to compress said seal means.

30. Apparatus according to claim 28, wherein said mold plate is mounted for rotation about an axis to shift said sets of cavities between said injecting and ejecting stations.

31. Apparatus according to claim 28 including a conveyor disposed at said ejecting station beneath said mold plate to receive lumps ejected therefrom.

32. Apparatus according to claim 28 including a multi-stage auger disposed in said hopper for displacing loose meat through said transfer conduit.

33. A method for forming loose meat into lumps comprising the steps of forcing loose meat into a plurality of cavities in a mold plate to form lumps therein, and directing pressurized gas through holes in back walls of said cavities and through diffusers located in such holes whereby the gas travels through convoluted passages in said diffusers and emerges as a dispersed pattern of streams which eject lumps of meat from said cavities.

34. A method according to claim 33 including the step of thereafter directing gas at a higher pressure through said diffusers to clear meat from said passages.

35. A method according to claim 33 including the step of terminating said forcing step in response to the occurrence of a preselected resistance to travel of the loose meat.

* * * * *